United States Patent
Abanami et al.

(10) Patent No.: US 8,191,011 B2
(45) Date of Patent: May 29, 2012

(54) MOTION ACTIVATED CONTENT CONTROL FOR MEDIA SYSTEM

(75) Inventors: Thamer Abanami, Seattle, WA (US); Jeffrey Fong, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 397 days.

(21) Appl. No.: 12/233,299

(22) Filed: Sep. 18, 2008

(65) Prior Publication Data

US 2010/0070926 A1   Mar. 18, 2010

(51) Int. Cl.
*G06F 3/048* (2006.01)
*G06F 3/14* (2006.01)
*G06F 3/023* (2006.01)

(52) U.S. Cl. ........ 715/835; 715/788; 715/802; 715/767; 715/716

(58) Field of Classification Search .................. 715/700, 715/765–767, 773, 781, 788.81, 815, 864, 715/835, 846; 345/156–179
See application file for complete search history.

(56) References Cited

U.S. PATENT DOCUMENTS

| | | | | |
|---|---|---|---|---|
| 5,812,128 A * | 9/1998 | Sterling, IV | ................ | 715/762 |
| 5,838,317 A * | 11/1998 | Bolnick et al. | ................ | 715/764 |
| 6,137,468 A | 10/2000 | Martinez et al. | | |
| 6,982,728 B1 | 1/2006 | Nicolas et al. | | |
| 7,277,928 B2 * | 10/2007 | Lennon | ................ | 709/219 |
| 7,586,032 B2 * | 9/2009 | Louis | ................ | 84/615 |
| 7,596,761 B2 * | 9/2009 | Lemay et al. | ................ | 715/779 |
| 7,698,092 B2 * | 4/2010 | Sano et al. | ................ | 702/141 |
| 7,716,605 B2 * | 5/2010 | Oh | ................ | 715/838 |
| 2002/0101457 A1 * | 8/2002 | Lang | ................ | 345/856 |
| 2003/0076343 A1 | 4/2003 | Fishkin et al. | | |
| 2004/0230599 A1 * | 11/2004 | Moore et al. | ................ | 707/102 |
| 2005/0085299 A1 | 4/2005 | Murzanski et al. | | |
| 2005/0093868 A1 | 5/2005 | Hinckley | | |
| 2005/0193094 A1 * | 9/2005 | Robbin et al. | ................ | 709/219 |
| 2006/0242596 A1 * | 10/2006 | Armstrong | ................ | 715/786 |

(Continued)

FOREIGN PATENT DOCUMENTS

EP    1645944 A1 *   4/2006

OTHER PUBLICATIONS

Pook. Interaction and Context in Zoomable User Interfaces, Thesis No. ENST 2001 E 024, Published Mar. 14, 2002.*

(Continued)

*Primary Examiner* — Weilun Lo
*Assistant Examiner* — Amy M Levy
(74) *Attorney, Agent, or Firm* — Alleman Hall McCoy Russell & Tuttle LLP

(57) ABSTRACT

A media system is described including a graphical display that presents an iconic menu and a textual menu. The iconic menu includes a plurality of icons arranged in a two-dimensional collection, where each icon provides access to media content. The textual menu includes a structured textual list that provides access to a media library including the media content. The iconic menu may be unlocked responsive to a first user input received at the user input device and may be locked responsive to a second user input received at the user input device. The plurality of icons of the iconic menu may be shuffled relative to each other without shuffling the structured textual list responsive to motion of the media system. The plurality of icons may be maintained in a fixed relative arrangement even if motion of the media system occurs if the iconic menu is locked.

18 Claims, 9 Drawing Sheets

U.S. PATENT DOCUMENTS

| | | | | |
|---|---|---|---|---|
| 2006/0277474 | A1* | 12/2006 | Robarts et al. | 715/745 |
| 2007/0125852 | A1* | 6/2007 | Rosenberg | 235/435 |
| 2007/0152984 | A1* | 7/2007 | Ording et al. | 345/173 |
| 2007/0156679 | A1* | 7/2007 | Kretz et al. | 707/6 |
| 2008/0066010 | A1 | 3/2008 | Brodersen et al. | |
| 2008/0122796 | A1* | 5/2008 | Jobs et al. | 345/173 |
| 2008/0163119 | A1* | 7/2008 | Kim et al. | 715/840 |

OTHER PUBLICATIONS

"Apple iPhone 1.1.3 Software Update", Jan. 17, 2008, 8 pages. http://www.pcadvisor.co.uk/reviews/index.cfm?reviewid=1633&pn=3.

"Sony Ericsson—Mobile phones—Overview—W910i", 2008, 2 pages. http://www.sonyericsson.com/cws/products/mobilephones/overview/w910i?cc=in&lc=en.

Barb Dybwad, "PowerbooTkip uAs opn npewlse! MCoonttaicot uns SenRSsS Foeerd as game controller", posted Mar. 21st 2005, 6 pages. http://laptops.engadget.com/2005/03/21/powerbook-apple-motion-sensor-as-game-controller/.

"1Pc Sample D990i "Sciphone" by Digitalrise—HiPhone-D990", 2006, 4 pages. http://www.chinagrabber.com/index.asp?PageAction=VIEWPROD&ProdID=1607&HS=1.

"Windows Mobile 7", Predicted release date 2009, 10 pages. http://www.popularasians.com/forum/showthread.php?t=28454.

"Japan's first motion sensitive cellphone: Toshiba V603SH", Posted on: Jan. 31, 2005, 3 pages. http://www.ubergizmo.com/15/archives/2005/01/japans,first_mo.html.

"Samsung's SCH-S310 Motion-Recognition Phone", Posted on: Jan. 12, 2005, 3 pages. http://www.ubergizmo.com/15/archives/2005/01/samsungs_schs31.html.

"International Search Report", Mailed Date: Apr. 16, 2010, Application No. PCT/US2009/057052, Filed Date: Sep. 15, 2009, pp. 11. (MS# 324530.02).

* cited by examiner

MOTION ACTIVATED CONTENT CONTROL FOR MEDIA SYSTEM

BACKGROUND

Computing devices such as personal computers, mobile phones, personal digital assistants, and portable audio/video players enable their users to access a variety of different content. Development of these computing devices has generally sought to expand the breadth of content that is made available to the user. For example, multi-purpose computing devices have been developed which incorporate features from two or more of these previously distinct computing devices to provide an even greater selection of content to the user.

SUMMARY

A media system is described which presents, by way of a graphical display, at least two different interactive menus that each provide access to different selections of media content. A textual menu presented by the graphical display includes a structured textual list that may be used to access a media library. An iconic menu presented by the graphical display includes a two-dimensional collection of icons which collectively provide access to a subset of media content of the media library. A user may rearrange or change a composition of these icons by imparting motion to the media system without changing the arrangement of the structured textual list. In this way, the user may change the subset of the media content that is accessible by the iconic menu without causing a change to an arrangement of the textual menu.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As the amount of media content made available to media device users increases, it may become more challenging for the user to navigate, locate, and access desired media content. The following description sets forth an approach which enables the user to rearrange and/or change a subset of the media content that is presented by the graphical display by moving or shaking the media device. The subset of media content may be graphically represented to the user by icons that depict or otherwise summarize the underlying media content. In this way, a user may discover interesting content that the user may not have otherwise located through a more structured navigation activity. On the other hand, the user may gain access to an entire selection of media content that is available from the media library by interacting with a more structured hierarchal menu that may be provided in addition to the iconic menu.

Figure 1:
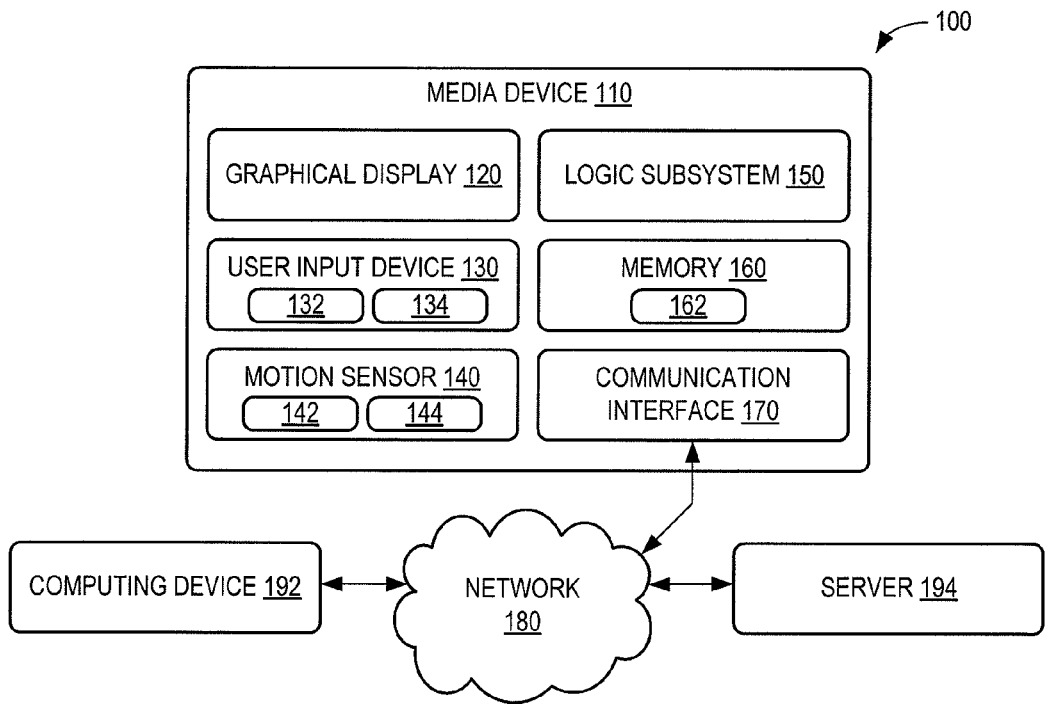
FIG. 1 schematically depicts a non-limiting example of a media device.

FIG. 1 schematically depicts a non-limiting example of a media system or media device 110 in the context of a communication system 100. Media device 110 may include one or more of the following components: a graphical display 120, a user input device 130, a motion sensor 140, a logic subsystem 150, memory 160, and a communication interface 170. It should be appreciated that media device 110 may include other suitable components beyond those specifically described herein.

Graphical display 120 may include any suitable output device for presenting visual media content. Non-limiting examples of graphical display 120 include liquid crystal displays (LCDs), plasma displays, cathode ray tube (CRT) displays, electronic paper displays, light emitting diode (LED) displays, rear projection displays, and front projection displays, among others and combinations thereof. As will be described in greater detail with reference to user input device 130, graphical display 120 may optionally include a touch-sensitive region for receiving user input. As such, graphical display 120 may be configured to provide both input and output functionality in some embodiments.

User input device 130 may include one or more user input components. For example, user input device 130 may include one or more buttons 132 which enable the media device to receive user input. One or more buttons 132 may include mechanical buttons or touch-sensitive buttons. In some embodiments, user input device 130 may include a touch-sensitive region 134 of graphical display 120. In some embodiments, the media device may receive user input via one or more buttons 132 and touch-sensitive region 134 of graphical display 120. As such, it should be appreciated that user input may be received by the media device via any suitable number and combination of user input components of the user input device.

Motion sensor 140, for detecting motion of the media device or more specifically for detecting motion of graphical display 120, may include one or more sensor elements. In some embodiments, motion sensor 140 includes one or more accelerometers 142. For example, motion sensor 140 may include a single-axis or multi-axis accelerometer for detecting motion of the media device and/or orientation of the media device relative to a gravitational vector. In some embodiments, motion sensor 140 may include an optical element 144 such as an image capture device (e.g., camera) for detecting motion of the media device.

In some embodiments, motion sensor 140 includes one or more accelerometers and an optical element, which may be used in combination to detect motion of the media device and/or orientation of the media device relative to the gravitational vector. For example, one or more accelerometers of the motion sensor may be used to identify motion of the media device that involves a changing acceleration of the media device and may provide an indication of an orientation of the media device relative to the gravitational vector, while the optical element may be used to identify motion of the media device even where the motion does not involve a changing acceleration of the media device or a change in an orientation of the media device relative to the gravitational vector (e.g., when media device moves at a constant velocity).

Logic subsystem 150 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, change the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Memory 160 may include one or more physical devices configured to hold data and/or instructions (e.g., depicted schematically at 162) that, when executed by the logic subsystem, cause the logic subsystem to implement the herein described methods and processes. Memory 160 may include removable media and/or built-in devices. Memory 160 may include optical memory devices, semiconductor memory devices, and/or magnetic memory devices, among others. Memory 160 may include portions with one or more of the following characteristics: volatile, nonvolatile, dynamic, static, read/write, read-only, random access, sequential access, location addressable, file addressable, and content addressable. In some embodiments, logic subsystem 150 and memory 160 may be integrated into one or more common devices and/or computing systems.

Media device 110 may communicate with a network 180 of communication system 100 via a communication interface 170. Communication interface 170 may include one or more of a receiver, transmitter, transceiver, etc. for communicating with network 180 via wireless and/or wired communication. Network 180 may represent one or more local area networks and wide area networks. As one example, network 180 represents the Internet. As another example, network 180 represents a short range local area network established between media device 110 and one or more other computing devices by a process that may be referred to as device pairing. In this way, media device 110 may utilize network 180 to communicate with one or more servers such as server 194 and one or more client computing devices such as computing device 192. As a non-limiting example, server 194 represents a web server, and computing device 192 represents a second media device.

Figure 2:
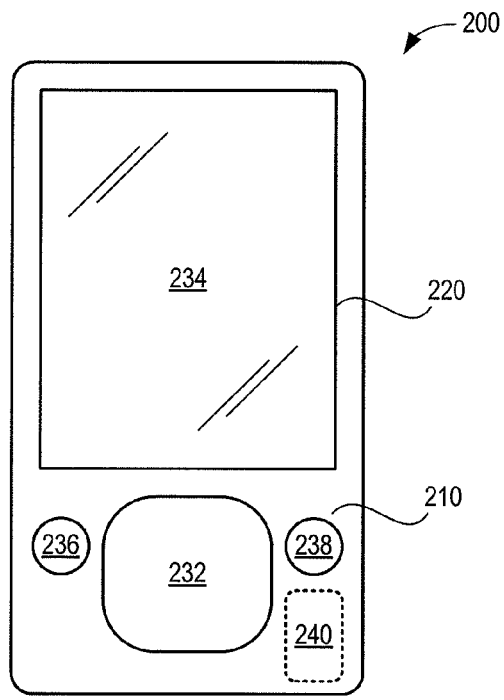
FIG. 2 illustrates a mobile media device as a non-limiting example of the media device of FIG. 1.

FIG. 2 illustrates a non-limiting example of a mobile media device 200. Mobile media device 200 may refer to the previously described media device 110. As such, the various methods, operations, process flows, and functionality described herein may be similarly performed by or applied to media device 110 and mobile media device 200. For example, mobile media device 200 may include a graphical display 220 which is analogous to graphical display 120 of FIG. 1. Graphical display 220 includes a touch-sensitive region 234 which is analogous to touch-sensitive region 134 of FIG. 1. In some embodiments, graphical display 220 may present a graphical representation of a button at the touch-sensitive region of the graphical display, whereby user input may be received via the touch-sensitive region of the graphical display when a user touches the graphical representation of the button.

Mobile media device 200 may further include a plurality of buttons 232, 236, and 238 which collectively are analogous to one or more buttons 132 of FIG. 1. In some embodiments, buttons 232, 236, and 238 may include mechanical buttons or touch-sensitive buttons. Touch-sensitive buttons may include a capacitive surface.

Mobile media device 200 may further include a motion sensor 240 as previously described with reference to motion sensor 140, a logic subsystem as previously described with reference to logic subsystem 150, memory as previously described with reference to memory 160, and a communication interface as previously described with reference to communication interface 170. One or more of these components may reside within or on-board a device body 210 of mobile media device 200. It should be appreciated that mobile media device 200 merely provides a non-limiting example of media device 110 of FIG. 1.

Figure 3:
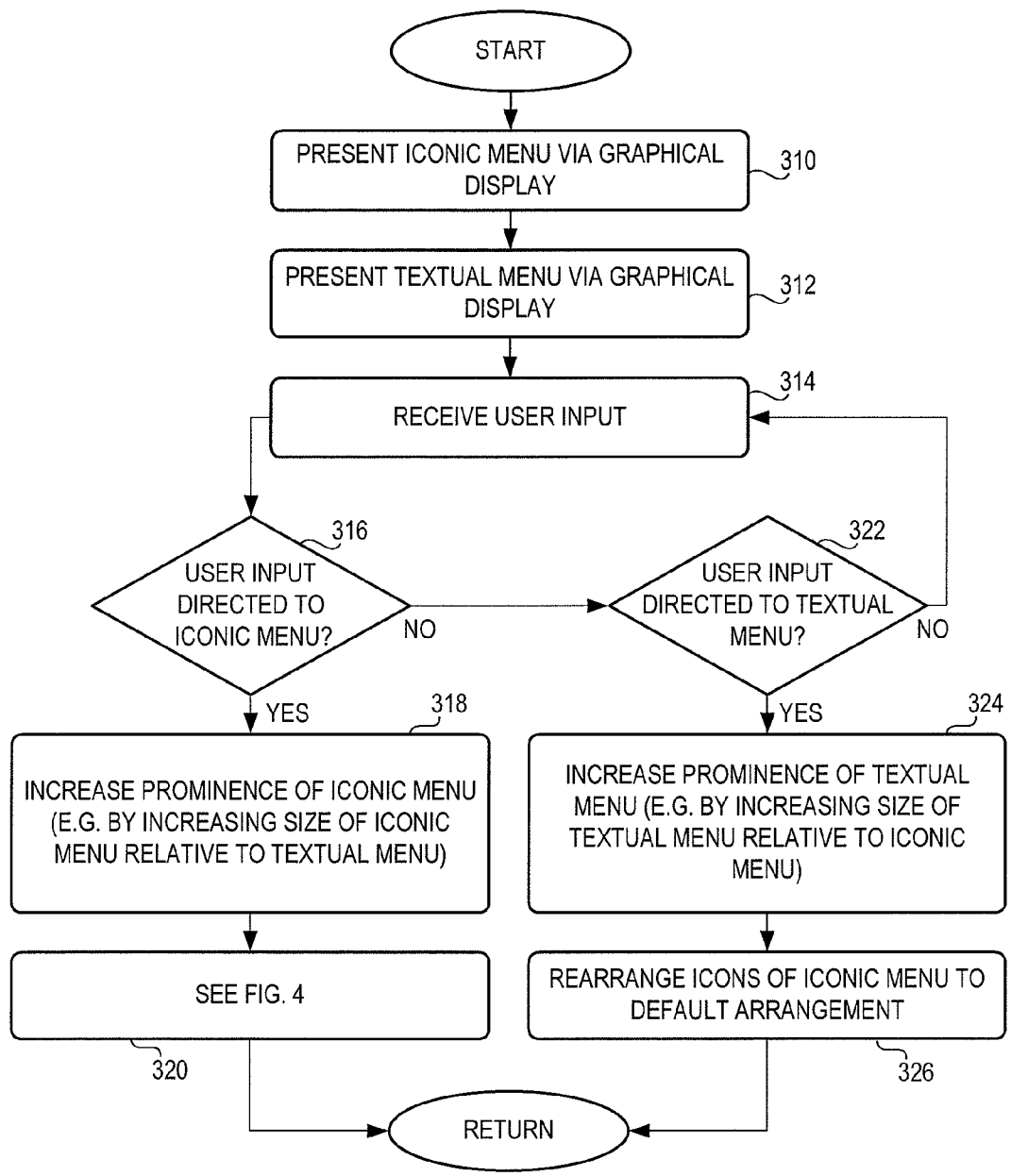
FIGS. 3-5 illustrate process flows that may be performed by the media device of FIG. 1.
Figure 4:
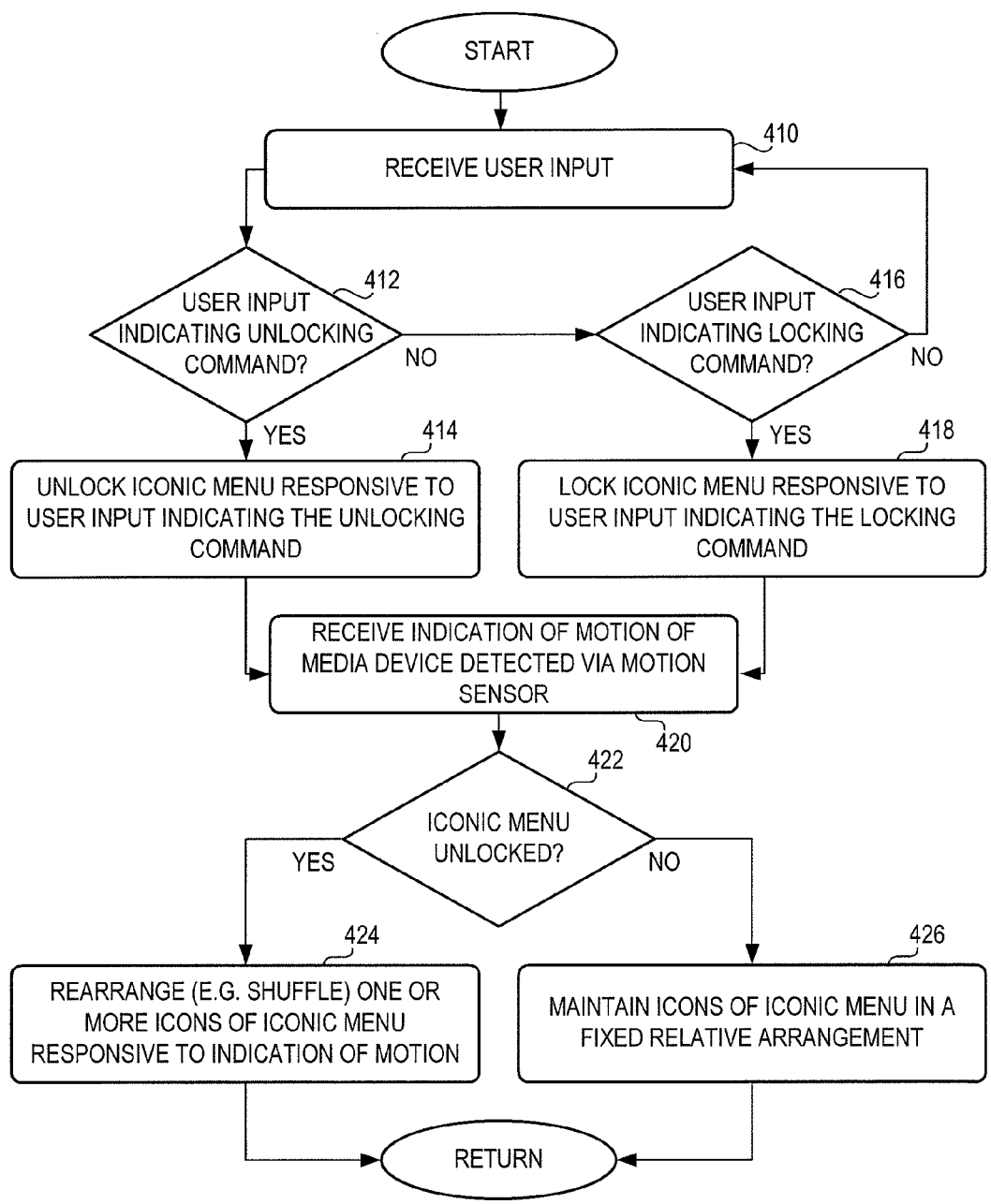
Figure 5:
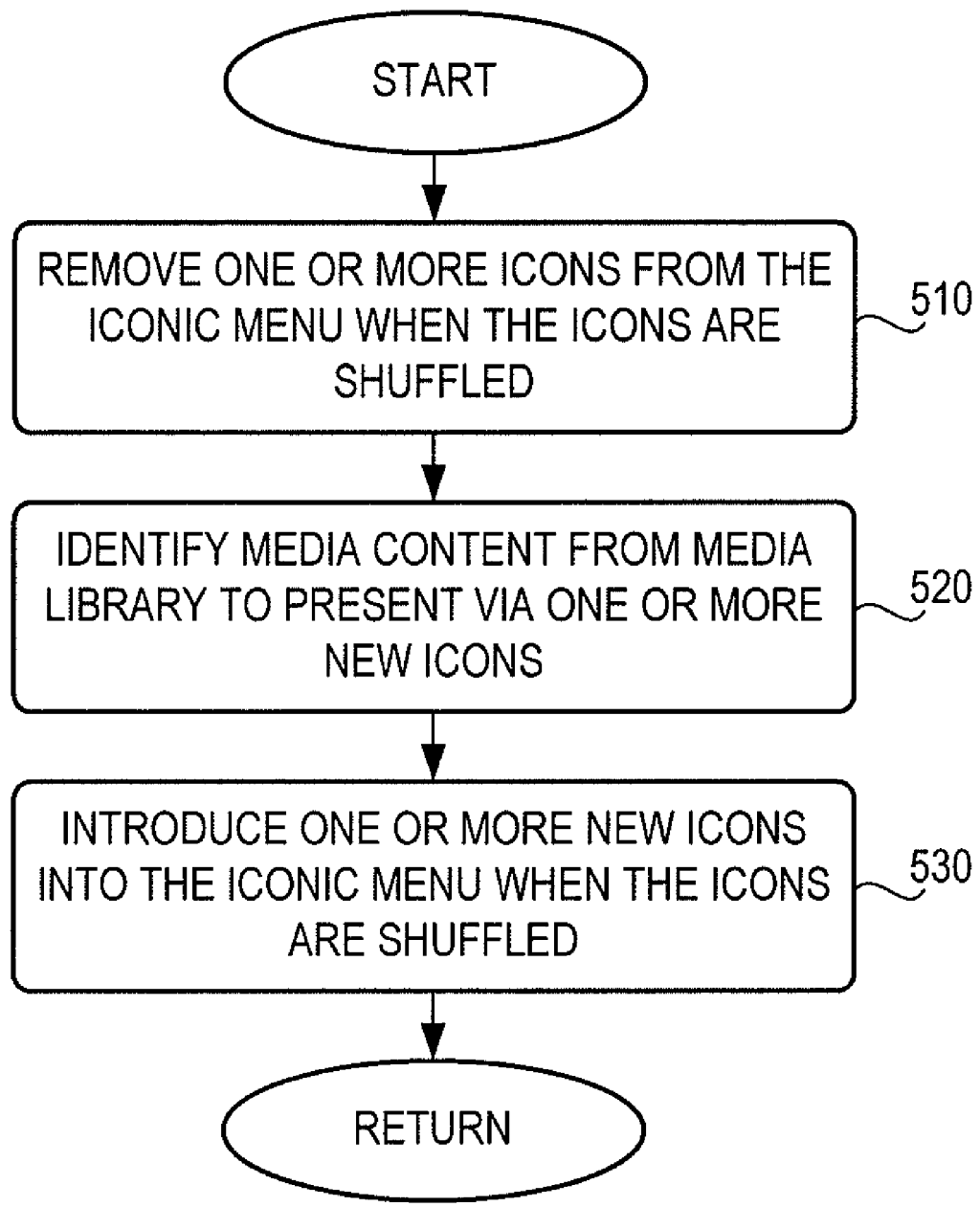
Figure 6:
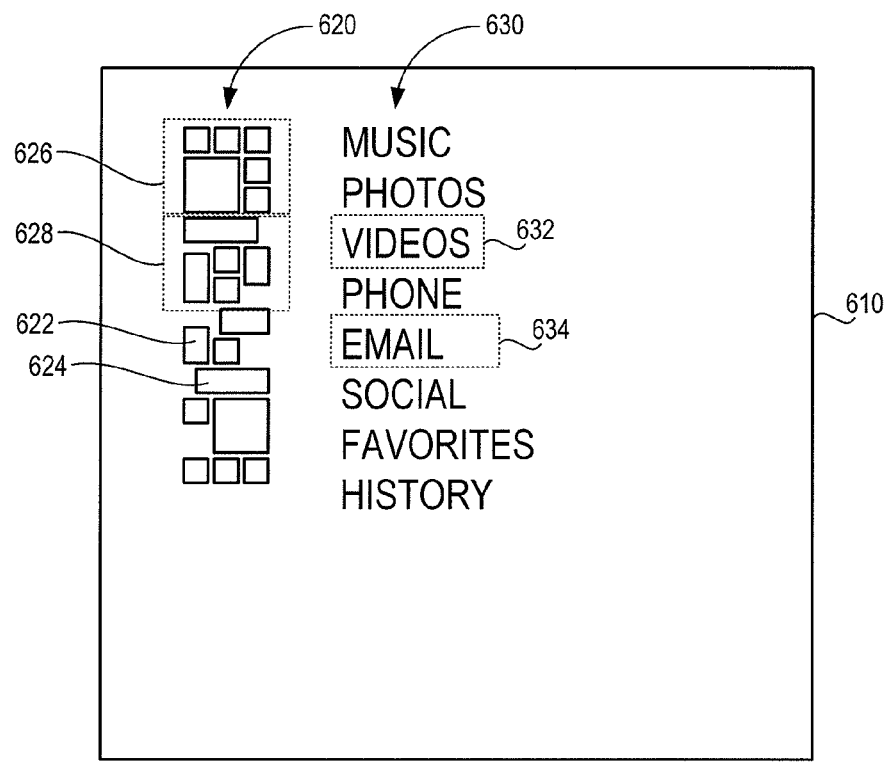
FIGS. 6 and 7 illustrate example graphical user interfaces that may be presented by the graphical display of the media device of FIG. 1.

FIGS. 3-5 represent process flows that may be performed by media device 110. It should be appreciated that these process flows may represent instructions that may be held in memory 160, and that may be executed by logic subsystem 150. These process flows describe how media device 110 may present a graphical user interface including two or more different menus via graphical display 120. FIG. 6, which will be described in greater detail in the context of the process flows of FIGS. 3-5, illustrates a non-limiting example of a graphical user interface 610 that may be presented by graphical display 120 or graphical display 220.

A first menu, which is referred to as textual menu 630, comprises a structured textual list that provides access to a media library. A second menu, which is referred to as iconic menu 620, comprises a plurality of icons where each icon of the plurality of icons provides access to media content. As a nonlimiting example, the iconic menu and the textural menu may be used to launch an application that assumes control of the display in order to present the underlying content. As another nonlimiting example, the iconic menu may be used to activate an embedded media player that, when selected, plays media content from within the iconic menu. The media content accessible via the iconic menu and the structured textual list may include one or more of visual content (e.g., static image or video content), audio content (e.g., music or audio recordings), communication content (e.g., phone, email, text messaging), favorite content (e.g., a user's favorite media content), recommended content (e.g., content recommended to the user in response to the user's past activity with the media device), newly available content (e.g., content that has recently been made available for access via the media system), recently added content (e.g., content that has been recently added to the media library or has been synched to the media device from a docking station), news about content (e.g., information that supplements content of the media library or announces content that is to be released in the future), social content (e.g., content associated with a user's friends or social acquaintances), and/or any other suitable content stored by or accessible by the media device. In some examples, the plurality of icons of the iconic menu may provide access to only a subset of the media content of the media library that is accessible through the textual menu.

As described herein, an icon may include an image or other suitable representation of underlying media content to which the icon provides access. As one example, an icon may include a picture that provides an exemplary depiction of the underlying media content. As another example, the icon may include a graphic, a letter, a word, an embedded video clip, an animation, or a combination of different visual elements. A user may select a particular icon and thereby interact with the underlying media content. In the context of video content, the icon that provides access to the video content may include an exemplary frame of the video content. In the context of webpage content, the icon providing access to the webpage content may include an exemplary webpage. As another example, an icon may include a symbol or text character that otherwise represents the underlying media content. As such, it should be appreciated that one or more icons of the iconic menu may include text characters that are the same as or similar to text characters associated with the text items of the textual list.

Referring now to the process flow of FIG. 3, at 310, an iconic menu may be presented by the media device via graphical display 120 or similarly by graphical display 220 of mobile media device 200. The iconic menu may include a plurality of icons arranged in a two-dimensional collection, where each icon of the plurality of icons provides access to media content. FIG. 6 illustrates an example of the two-dimensional collection of icons of iconic menu 620. FIG. 6 further illustrates how the plurality of icons may have disparate relative sizes and/or shapes. For example, icon 622 that is presented by the graphical display has a different size and shape than icon 624. The size and shape of the icons may vary with the type and/or significance of the underlying media content.

FIG. 6 also illustrates, as a non-limiting example, how the two-dimensional collection of icons may define one or more columns of icons and two or more rows of icons. A size of the one or more columns and a size of the one or more rows of the two-dimensional collection may be based on a size of each icon. For example, referring to region 626 of iconic menu 620, a first row of icons may include three columns of smaller icons than a second row which includes only two columns of icons as a result of an icon within the second row having a larger size relative to each of the icons of the first row.

Region 626 of iconic menu 620 also illustrates how the two-dimensional collection of icons may define a structured grid or array of icons in some embodiments. In some embodiments, the two dimensional collection of icons may alternatively or additionally define an unstructured grid or array of icons as depicted at region 628 of iconic menu 620. In this particular example, each icon may be arranged in the two-dimensional collection without explicitly defined columns or rows, rather the relative size and shape of the icons may define the overall arrangement and configuration of the iconic menu.

In some embodiments, iconic menu 620 may include at least one icon that at least partially overlaps with another icon and/or at least one icon with an orientation different than the orientation of another icon. In other words, the icons may have a somewhat random appearance, as if the icons where physical cards poured onto a table.

Icons of iconic menu 620 may correspond to a subset of content accessible via the below described textual menu. In particular, such icons may correspond to content available at different levels of a hierarchal structure of the textual menu.

Referring again to the process flow of FIG. 3, at 312, a textual menu may be presented via graphical display 120 or 220. The textual menu, in contrast to the iconic menu, may include a structured textual list that provides access to a media library, including the media content that may be accessed by the iconic menu. As such, the textual menu may provide access to a larger amount of media content than the iconic menu. The media library may include or refer to media content that is stored at memory 160 and may further include media content that is stored remotely, such as at server 194 or computing device 192. Remote media content may be accessed by the media device via network 180. In this way, the plurality of icons of the iconic list may collectively provide access to only a subset of the media content of the media library, whereas the structured textual list of the textual menu may provide access to all or a greater amount of media content of the media library.

A non-limiting example of the textual menu is illustrated in FIG. 6 at reference numeral 630. The textual menu may include one or more text items, examples of which are indicated at 632 and 634. In some embodiments, each text item of the textual menu may refer to a category of media content of the media library. For example, the textual menu may include a first text item 632 that indicates "VIDEOS" and a second text item 634 that indicates "EMAIL". In some embodiments, an icon may be presented with a text item. In some embodiments, the textual list may include one or more easily identifiable icons in place of a purely textual representation (e.g., a text item in the form of a camera icon in place of the word "PHOTOS").

A user may explore the media library by selecting a text item that represents a category of media content that the user desires to access or explore. In some embodiments, textual menu 630 may correspond to a hierarchal file tree structure of the media library and may comprise one or more structured textual lists having corresponding parent and child relationships. Selection of a particular text item may cause the textual menu to expand to present sub-lists that may be used to access media content of the media library.

Referring again to the process flow of FIG. 3, at 314, the media device may receive user input via user input device 130. The user input received at 314 may be characterized as being directed to either the iconic menu or the textual menu. As a non-limiting example, the user input may select an icon from the iconic menu or a text item from the textual menu via a button (e.g., one or more buttons 132 or button 232) or via a touch-sensitive region of graphical display 120 (e.g., touch-sensitive region 134 or 234).

In some embodiments, the logic subsystem may be configured to receive the user input via the user input device and judge whether the user input was directed to the iconic menu or textual menu. For example, in the context of the user input being received via the touch-sensitive region of the graphical display, the logic subsystem may identify whether the user has touched the graphical display closer to the iconic menu or closer to the textual menu, and may judge that the user input was directed to the closer or more proximate menu of either the iconic menu and textual menu.

At 316, if the user input received at 314 was directed to the iconic menu, the process flow may proceed to 318. At 318, a prominence of the iconic menu may be increased in response to receiving the user input directed to the iconic menu. In some embodiments, the prominence of the iconic menu may be increased by increasing a size of the iconic menu relative to a size of the textual menu. For example, the iconic menu may be increased in size to a prominent scale and the textual menu may be reduced in size to a diminished scale.

Figure 7:
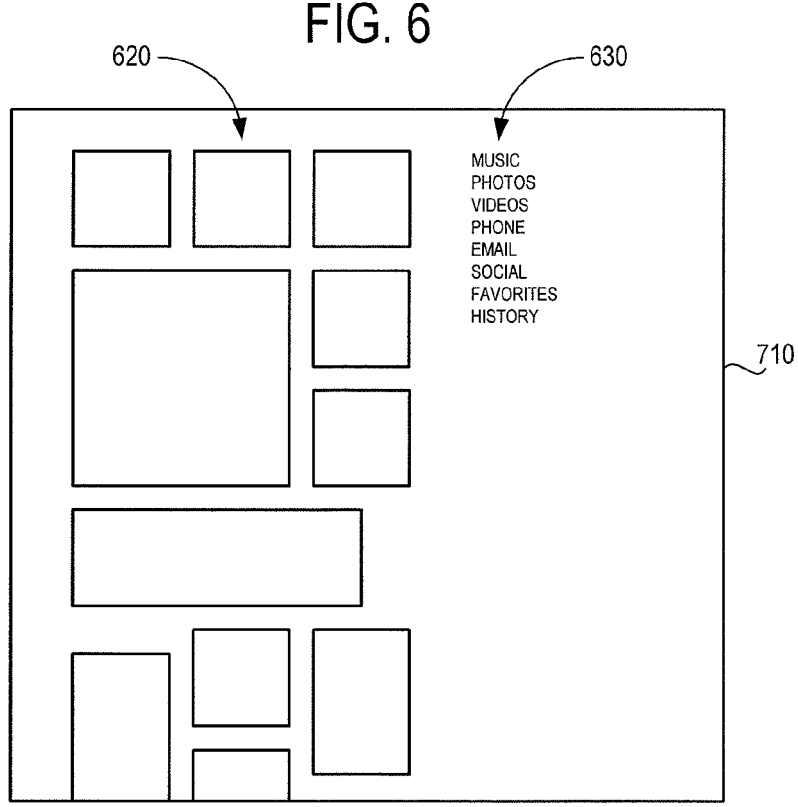

FIG. 6 shows iconic menu 620 presented in a diminished scale and shows textual menu 630 presented in a prominent scale. In contrast to FIG. 6, FIG. 7 illustrates a graphical user interface 710 that presents iconic menu 620 in the prominent scale and textual menu 630 in the diminished scale. As a non-limiting example, the prominence of the iconic menu may be increased at 318, for example, by causing the graphical display to present graphical user interface 710 after initially presenting graphical user interface 610 in response to the user input being directed to the iconic menu.

In other embodiments, the prominence of the iconic menu may be increased by increasing the size of iconic menu to the prominent scale without changing the size of the textual menu. In other embodiments, the textual menu may be reduced in size to the diminished scale without changing the size of the iconic menu. In this way, the iconic menu may be given the appearance of moving to the foreground of the graphical display and the textual menu may be given the appearance of receding to the background of the graphical display in response to receiving a user input that is directed to the iconic menu. In some embodiments, blurring of the iconic menu or the textual menu may accompany a reduction in size to the diminished scale to further provide the appearance receding to the background. In still other embodiments, those elements which have been diminished may be at least temporarily removed from the display, so that those elements are completely out of a user's view.

From 318, the process flow may proceed to 320. The operation at 320 is described in greater detail with reference to FIG. 4. Referring also to the process flow of FIG. 4, at 410 a user input may be received at the media device via the user input device. In some embodiments, the user input that is received at 410 may be separate and distinct from the user input that was received at 314. For example, the user input received at 410 may indicate a locking command or an unlocking command with respect to the iconic menu as will be further described with reference to the process flow of FIG. 4. By contrast, the user input received at 314 may indicate whether the user is interacting with the iconic menu or the textual menu, which may be identified by whether the user input received at 314 is directed to the iconic menu or the textual menu.

Further, it should be appreciated that the user input may be received at 410 via a different user input component than the user input that is received at 314. For example, the user input may be received at 410 via a button (e.g., one or more buttons 132 of FIG. 1 or button 232 of FIG. 2) while the user input may be received at 314 via a touch-sensitive region of the graphical display (e.g., touch-sensitive region 134 or touch-sensitive region 234 of FIG. 2). In other examples, these user inputs may be received at 410 and 314 via the same user input component, such as via the same button or via the same touch-sensitive region of the graphical display. In other examples, the user inputs received at 314 and 410 may be the same user input (i.e., may be responsive to the same physical act by the user).

Further still, in some embodiments, the user input received at 410 may include motion of the media device or media system as identified by the motion sensor. As such, the user input received at 410 in the form of motion of the media device or media system (e.g., a shaking motion) may cause the iconic menu to be unlocked, for example, if the motion satisfies a pre-determined condition, such as exceeding a pre-determined intensity, magnitude, amplitude, frequency, etc. Therefore, it should be appreciated that the iconic menu may be unlocked in some embodiments without receiving user input via a button or a touch-sensitive region of the graphical display.

If at 412, the user input received at 410 indicates an unlocking command for unlocking the iconic menu, the process flow may proceed to 414. As a non-limiting example, the user may unlock the iconic menu to change a relative arrangement of the plurality of icons of the iconic menu by pressing a button (e.g., button 232 of FIG. 2) or by touching a touch-sensitive region of the graphical display (e.g., touch-sensitive region 234 of FIG. 2). In some embodiments, a user of the media device may be prompted by the graphical display to input one or more of an unlocking command or a locking command. As such, it should be appreciated that the logic subsystem may judge at 412 whether the user input received at 410 indicates a locking command or an unlocking command.

At 414, iconic menu may be unlocked (i.e., set to an unlocked state) responsive to the user input received at 410 indicating the unlocking command. As will be described in greater detail with reference to operation 424, the plurality of icons of the iconic menu may be rearranged (e.g., shuffled) in response to motion of the media device (e.g., shaking, tilting, or rotating the media device) if the iconic menu is unlocked or is set to the unlocked state.

If the user input received at 410 does not indicate an unlocking command, the process flow may proceed to 416. If at 416, the user input received at 410 indicates a locking command for locking the iconic menu, the process flow may proceed to 418. At 418, the iconic menu may be locked responsive to the user input received at 410 indicating the locking command. In some embodiments, the media device may unlock the iconic menu responsive to a first user input received at the user input device and the media device may lock the plurality of icons (i.e., set the iconic menu to a locked state) responsive to a second user input received at the user input device. For example, the user may utilize the same user input component (e.g., button or touch-sensitive region of the graphical display) to perform both locking and unlocking of the iconic menu. Otherwise, if the answers at 412 and 416 are judged no, the process flow may return to 410 where subsequent user inputs may be received.

At 420, an indication of motion of the media device or an indication of motion of at least the graphical display portion of the media device may be received via the motion sensor. For example, where the motion sensor includes one or more accelerometers, an indication of motion may be received from the accelerometers in response to an acceleration of the media device occurring as a result of motion of the media device. Where the motion sensor includes an optical element, an indication of motion may be received in response to motion of media device even if the media device does not experience a changing acceleration or a change in an orientation of media device relative to the gravitational vector.

If at 422, the iconic menu is unlocked (i.e., set to the unlocked state at 414), the process flow may proceed to 424. In some embodiments, the logic subsystem may judge at 422 whether the iconic menu is set to the locked state or the unlocked state before proceeding to 424 or 426.

At 424, one or more icons of the iconic menu may be rearranged (e.g., shuffled) responsive to an indication of motion received at 420 (i.e., motion detected by the motion sensor). As one example, the plurality of icons may be rearranged relative to each other in a random manner or in pre-determined manner. In some embodiments, the plurality of icons may be shuffled relative to each other without shuffling or otherwise rearranging the structured textual list of the textual menu responsive to motion detected by the motion sensor if the iconic menu is unlocked. The operation at 424 will be described in greater detail with reference to FIGS. 9-12.

If at 422, the iconic menu is instead locked (i.e., set to the locked state at 418), the process flow may proceed to 426. At 426, the plurality of icons of the iconic menu may be maintained in a fixed relative arrangement so that the icons are not rearranged relative to each other if motion of the media device is detected by the motion sensor while the iconic menu is locked. In this way, the iconic menu may respond to motion of the media device differently depending on whether the iconic menu is locked or unlocked. From 424 or 426, the process flow may return. The operation at 426 will be described in greater detail with reference to FIG. 8.

Figure 8:
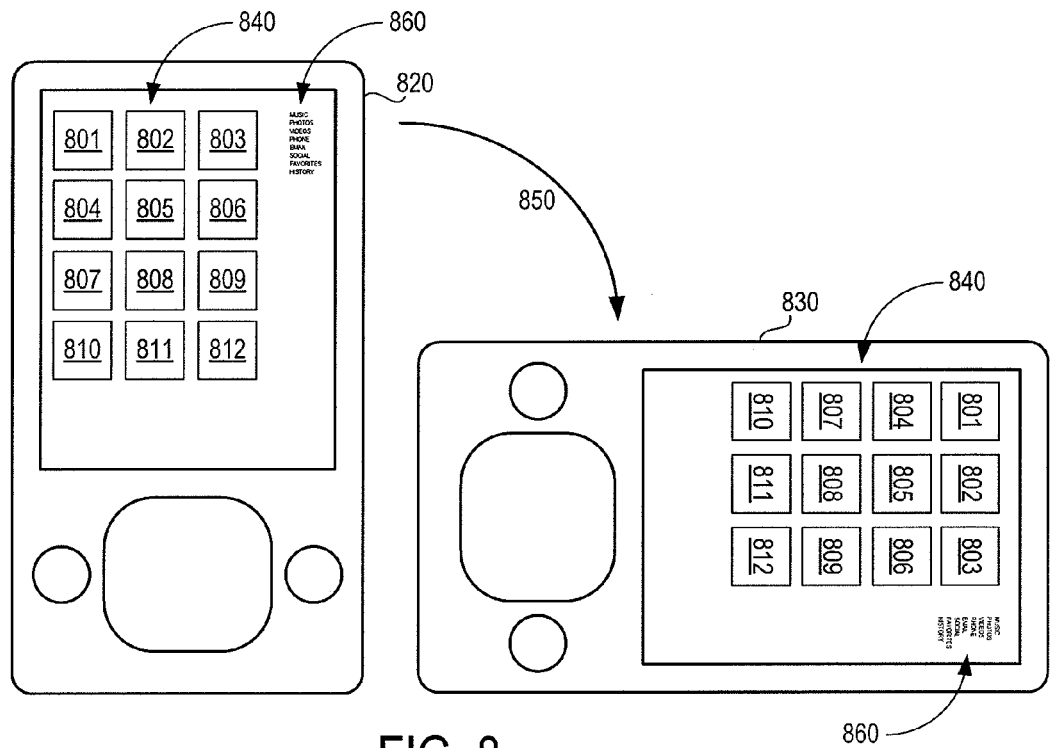
FIGS. 8-12 illustrate example graphical user interfaces that may be presented by the graphical display of a media device in the context of the mobile media device of FIG. 2.

Referring now to FIG. 8, mobile media device 200 of FIG. 2 is illustrated in a first position 820 and a second position 830. It should be appreciated that FIG. 8 will be described in the context of mobile media device 200, but may be similarly applied in the context of media device 110 of FIG. 1. In this particular example, media device 200 is presenting an iconic menu 840 via the graphical display. Iconic menu 840 may refer to the iconic menu that was previously described with reference to FIGS. 3-7. Iconic menu 840 in this particular example includes a plurality of icons 801-812. It should be appreciated that iconic menu 840 is depicted schematically for ease of explanation. As such, it should be appreciated that the iconic menu may include any suitable number, shape, and arrangement of icons, and that such icons may take a variety of different forms. Textual menu 860 is depicted in the diminished scale and iconic menu 840 is depicted in the prominent scale.

Figure 9:
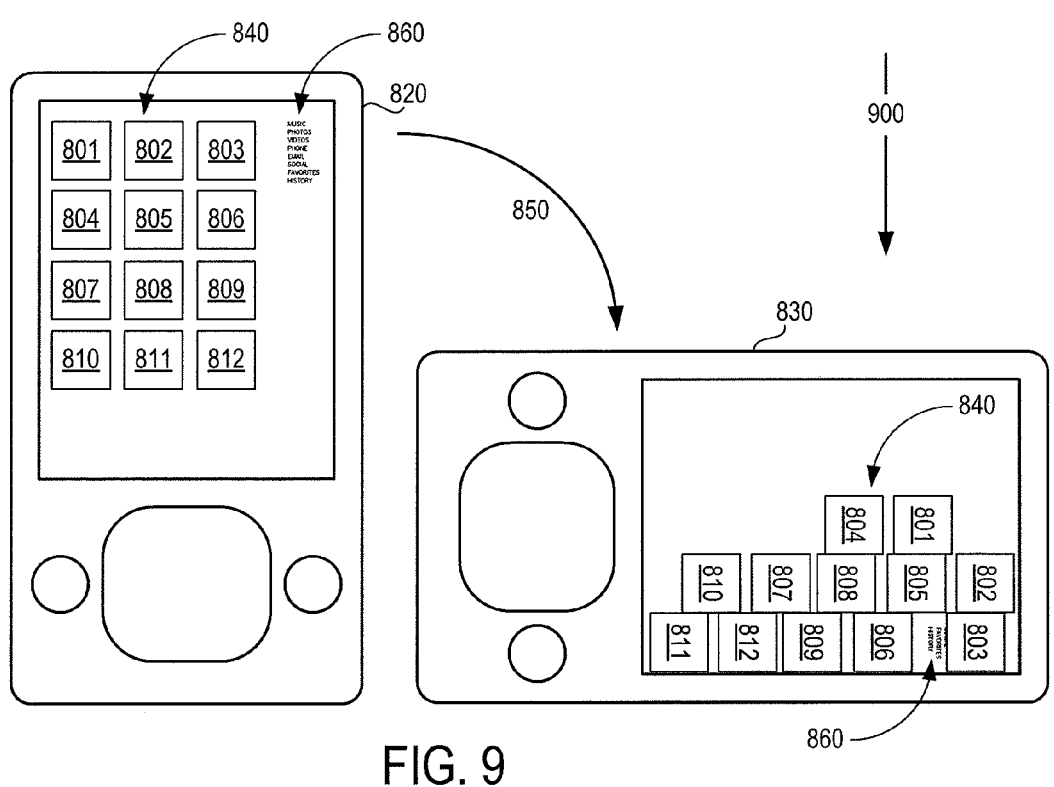

As the mobile media device is moved from first position 820 to second position 830 as indicated by arrow 850, the plurality of icons of iconic menu 840 are maintained in a fixed relative arrangement if the iconic menu is locked (e.g., in accordance with operation 426 of FIG. 4). This is true even if motion of the media device is detected by the motion sensor. It should be understood that in some embodiments the icons may rotate, so as to appear right-side-up, while being maintained in a fixed relative arrangement. In contrast to the example depicted by FIG. 8, FIG. 9 illustrates how iconic menu 840 may be rearranged responsive to motion detected by the motion sensor when the iconic menu is unlocked. In this particular example, iconic menu 840 is unlocked at 414, for example.

As the media device is moved from position 820 to 830 in FIG. 9, as indicated by arrow 850, the plurality of icons of iconic menu 840 are translated relative to their initial position depicted at 820. In this particular example, each of icons 801-812 are translated relative to gravity vector 900. It should be appreciated that the icons may be permitted to at least partially overlap the textual menu in some embodiments as indicated at position 830 of FIG. 9. In some embodiments, each of icons 801-812 may represent a mass that responds to the gravity vector identified by the motion sensor when the iconic menu is set to the unlocked state. In this way, the user of the media device may rearrange one or more icons of the iconic menu by unlocking the iconic menu and moving the media device.

Figure 10:
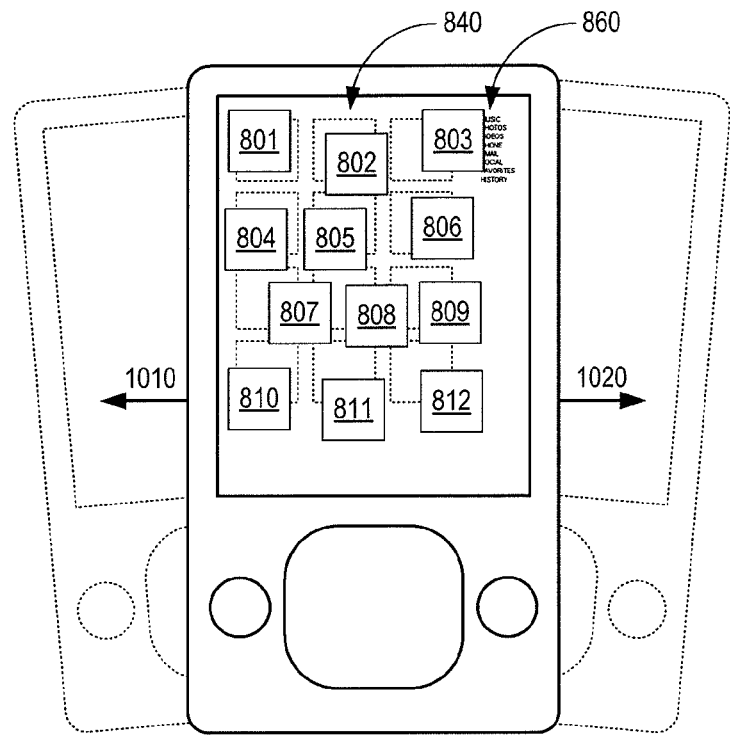

FIG. 10 illustrates yet another example depicting how icons 801-812 of iconic menu 840 may be rearranged relative to each other responsive to motion of the media device. In this particular example, iconic menu 840 is set to the unlocked state and a shaking motion is imparted to the media device as indicated by arrows 1010 and 1020. It should be appreciated that arrows 1010 and 1020 provide merely a schematic depiction of an example shaking motion, and that the media device may be shaken in different directions beyond those depicted by arrows 1010 and 1020. As illustrated by FIG. 10, icons 801-812 of the iconic menu may begin to move relative to their initial arrangement that was indicated at position 820 of FIG. 8 without rearranging the textual menu.

Figure 11:
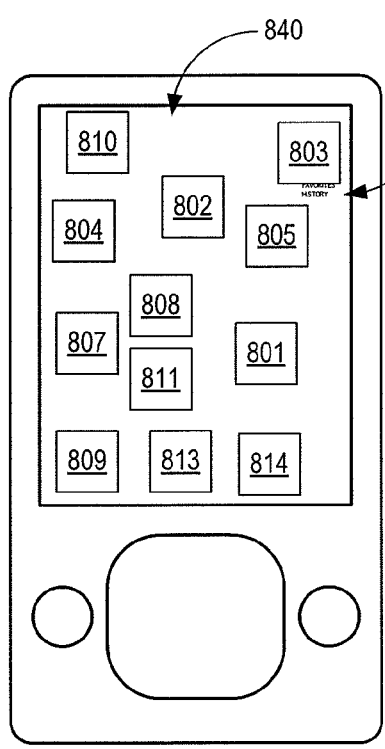

FIG. 11 illustrates a non-limiting example of how the icons of the iconic menu may be rearranged to a different arrangement responsive to the shaking motion illustrated in FIG. 10. For example, iconic menu 840 may be rearranged from a default arrangement depicted, for example, at position 820 of FIG. 8, to a shuffled arrangement depicted in FIG. 11. As depicted by FIG. 11, the plurality of icons may be shuffled relative to each other by changing a relative arrangement of one or more icons of the plurality of icons from a first arrangement (e.g., the default arrangement) to a second arrangement (e.g., a shuffled arrangement) in at least two dimensions of the graphical display. A fixed angular orientation of each of the plurality of icons relative to the graphical display may be maintained from the first arrangement to the second arrangement, or an orientation of one or more icons may change. It should be appreciated that the user of the media device may be permitted to rearrange or shuffle the icons of the iconic menu as often as desired by again imparting motion to the media device (e.g., shaking or tilting the media device).

Referring also to the process flow of FIG. 5, in some embodiments, one or more icons of the iconic menu may be removed from the iconic menu when the iconic menu is shuffled by motion of media device, as indicated at 510. For example, as depicted by FIG. 11, icon 806 and icon 812 were removed from the iconic menu responsive to motion of the media device. In some embodiments, the number of icons removed from the iconic menu may be increased in response to an increase in one or more of: the magnitude of the motion, the direction of the motion, duration of the motion, and/or the frequency of the motion, as detected by the motion sensor.

Furthermore as indicated at 520 and 530, in some embodiments, one or more new icons may be introduced into the iconic menu when the iconic menu is shuffled by motion of the media device. The one or more new icons that were introduced into the iconic menu may provide access to different media content or a different subset of media content of the media library that was not previously accessible via the iconic menu before the plurality of icons were rearranged or shuffled. As one example, at 520, the logic subsystem may identify media content from the media library to present to the user via one or more new icons.

In some embodiments, the media content identified at 520 may include recommended content, where the recommended content is identified from the media library responsive to an operating condition of the media device. As one example, the operating condition of the media device includes media content that was previously accessed by the user via the plurality of icons, via the structured textual list, or via another mechanism. In this way, the media device may identify media content based on the user's past interaction with the media device, including media content that the user previously accessed. The one or more new icons may replace one or more icons of the iconic menu responsive to shuffling of the plurality of icons where the new icons provide access to a second subset of media content of the media library. It should be appreciated that the recommended content may include media content that resides in memory on-board the media device or may reside at a remote location relative to the media device, such as at computing device 192 or server 194.

At 530, one or more new icons may be introduced into the iconic menu when the icons are rearranged or otherwise shuffled by the motion of the media device. For example, the new icons introduced into the iconic menu may provide access to the media content identified at 520. In some embodiments, the number of new icons introduced into the iconic menu may be equal to the number of icons removed from the iconic menu at 510. In this way, the user may introduce new icons into the iconic menu that provide access to a different subset of media content of the media library by moving or shaking the media device.

As a non-limiting example, the icons of the iconic menu may each represent different categories of media content of the media library. For example, a different icon may be provided for one or more of the following media categories: new media content, history of media content accessed by user, favorite media content, media content associated with friends or acquaintances of the user, and other suitable media categories. The process flow of FIG. 5 may be used to remove icons representing the different categories of media content from the iconic menu (e.g. at 510), whereby the new icons introduced to the iconic list (e.g. at 530) may include icons representing media content of a select media category.

For example, at 520 of the process flow, the new media content identified for presentation via one or more new icons may include identifying media content within the media category of favorite media content. As such, in response to a user shaking or moving the media device while the iconic menu is in the unlocked state, the graphical display may present one or more new icons that provide access to media content that is part of the favorite media content category (or any other suitable category of media content).

In some embodiments, upon further shaking of the media device, the new icons introduced into the iconic menu may provide access to content that is also within the same media category. For example, in response to shaking of the media device, the graphical display may present icons that represent media content on a next page or file container of a particular media category. It should be appreciated that the new media content and associated new icons introduced to the iconic menu may be randomly identified at 520 or may be identified based on a pre-determined criteria (e.g. file size, time since last accessed by the user, number of times accessed by user, file name, etc.). Furthermore, it should be appreciated that the new content that may be accessed by the new icons introduced into the icon menu may reside at memory on-board the device or may reside at a remote location (e.g. the user's personal computer) that is accessible via wired or wireless communication.

In some embodiments, the media device may be configured to introduce new icons to the iconic menu from a different category of media content in response to a shake of the media device. To continue with the above example, the icons that provide access to media content that is part of the favorite media content category may be removed from the iconic menu in response to a shake of the media device and new icons may be introduced into the iconic menu that represent media content of a different category, such as media content associated with a history of media content that was previously accessed by the user. In this way, the media device may be configured to respond to shaking of the media device by expanding on a particular category of media content, and then presenting content from a different category each time the media device is shaken.

Returning once again to the process flow of FIG. 3, if the user input is not directed to the iconic menu (e.g., 316 is judged no), the process flow may proceed to 322. At 322, if the user input received at 314 was directed to the textual menu, the process flow may proceed to 324. At 324, a prominence of the textual menu may be increased by increasing a size of the textual menu relative to a size of the iconic menu. For example, as previously described with reference to FIGS. 6 and 7, the iconic menu may be reduced in size to a diminished scale and the textual menu may be increased in size to a prominent scale as shown in FIG. 6. In other embodiments, the textual menu may be increased in size without changing the size of the iconic menu. In still other embodiments, the iconic menu may be reduced in size without changing the size of the textual menu. In this way, the textual menu may be given the appearance of moving to the foreground of the graphical display and the iconic menu may be given the appearance of moving to the background of the graphical display in response to receiving a user input that is directed to the textual menu.

At 326, the plurality of icons of the iconic menu may be optionally rearranged to the default arrangement from the shuffled arrangement in response to receiving a user input at 314 that is direct to the textual menu. For example, where a first user input unlocks the iconic menu and a second user input locks the iconic menu, a third user input that is directed to the textual menu may cause the iconic menu to be rearranged to the default arrangement, even in the absence of motion and notwithstanding the locked state of the iconic menu. In this way, a size of the iconic menu may be increased relative to a size of the textual menu responsive to the third user input received at the user input device if the third user input is directed to the iconic menu, and the size of the textual menu may be increased relative to the size of the iconic menu if the third input received at the user input device is directed to the textual menu. As such, a single user input that is directed to the textual menu may cause the iconic menu to be rearranged at 326 and may cause the prominence of the textual menu to be increased at 324, while at least two different user inputs may be used to increase the prominence of the iconic menu and to unlock the iconic menu for rearranging (e.g., shuffling) the iconic menu when the iconic menu is presented in the prominent scale. From 320 or 326, the process flow may return.

Figure 12:
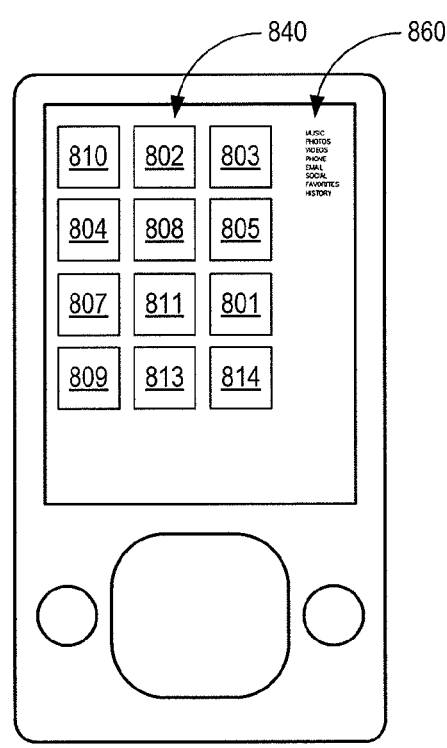

Referring now to FIG. 12, in some embodiments, the plurality of icons may be returned to a predetermined arrangement after being shuffled without receiving additional user input. For example, the iconic menu may proceed from the arrangement depicted at position 820 of FIG. 8 to the arrangement shown in FIG. 12 after being shuffled in response to motion of the media device. In other embodiments, the plurality of icons may remain in an unstructured or random arrangement after being shuffled, as shown in FIG. 11, until a user input is received at the user input device that causes the plurality of icons to be returned to the predetermined arrangement. For example, a user may shuffle the iconic menu and cause the icons to return to a predetermined arrangement after they are shuffled by pressing a button or by touching a touch-sensitive region of the graphical display.

Figure 13:
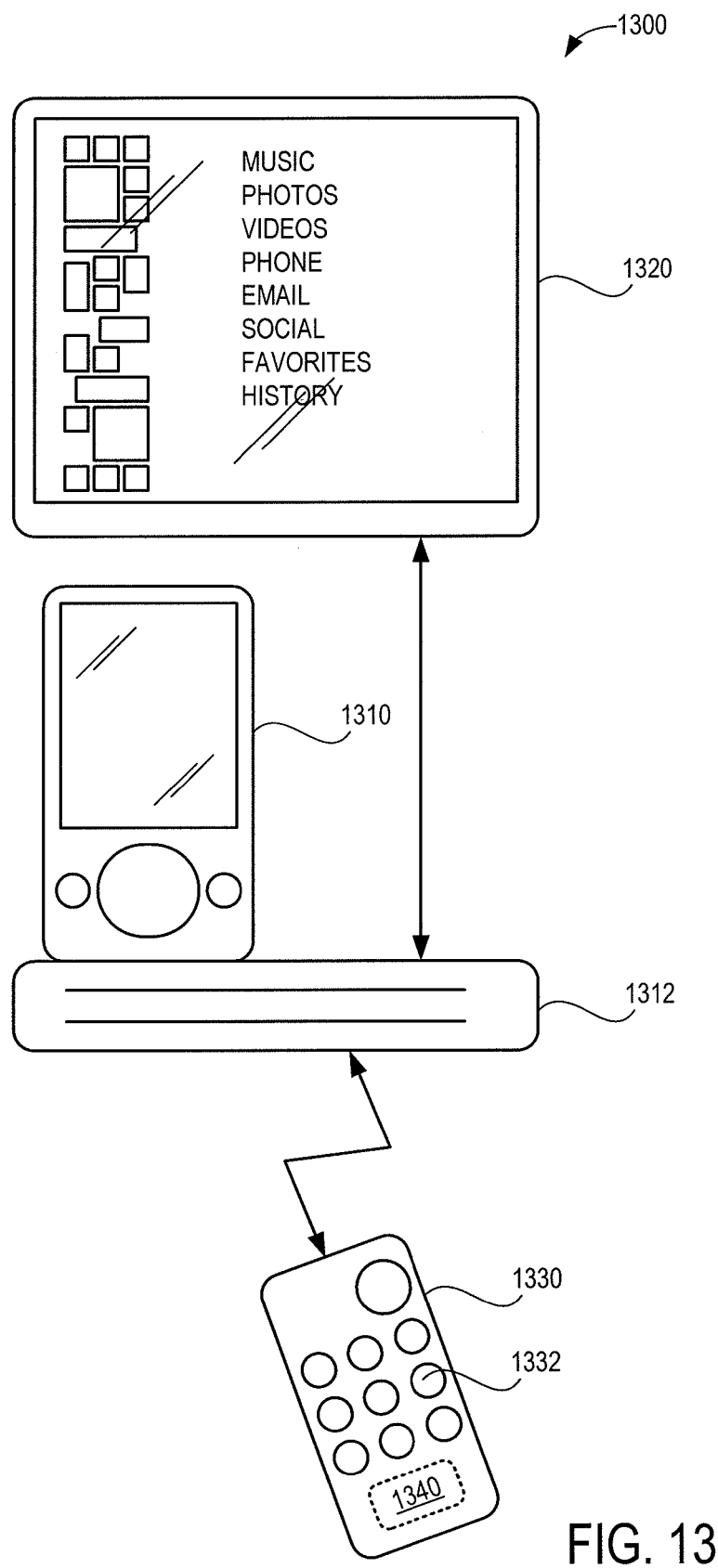
FIG. 13 shows a media system including a remote control in accordance with an embodiment of the present disclosure.

FIG. 13 illustrates an example embodiment of a media system 1300 in accordance with an embodiment of the present disclosure. As used herein, the phrase "media system" is used to describe all devices and/or combination of devices that may cooperate with each other to perform the herein describe methods and processes. The phrase "media device" is used to describe a media system that has its functional components (e.g., graphical display, motion sensor, user input, etc.) integrated into a single device. As such, media system 1300 is analogous to the previously described media device 110, and the various methods, operations, process flows, and functionality described above may be similarly performed by or applied to media system 1300. In this particular embodiment, at least some components of media system 1300 are provided as physically separate device components that may communicate with each other via wired or wireless communication.

For example, media system 1300 may include a graphical display 1320 which is analogous to graphical display 120 of FIG. 1. In some embodiments, graphical display 1320 may include a television or computer monitor. Media system 1300 may further include a docking station 1312 to which a mobile media device 1310 may be docked. Mobile media device 1310 may refer to mobile media device 200 of FIG. 2, for example. Mobile media device 1310 may communicate with and receive battery charging from docking station 1312 when docked to docking station 1312.

Media system 1300 may further include a remote control 1330. Remote control 1330 may include one or more buttons such as button 1332 and may further include a motion sensor 1340. Button 1332 is analogous to the one or more buttons 132 of FIG. 1 and motion sensor 1340 is analogous to motion sensor 140 of FIG. 1.

Remote control 1330 may be operated by a user to access content and rearrange how content is presented via graphical display 1320. For example, as previously described with reference to the process flows of FIGS. 3-5, a user may press a button such as button 1332 to unlock the iconic menu presented via the graphical display. The user may then shake or move remote control 1330 as detected by motion sensor 1340 to cause icons of the iconic menu to be rearranged (e.g. shuffled). As such, the example embodiment of FIG. 13 illustrates how the media system may perform the various functions and processes described herein through cooperation of multiple physically separate device components.

Figure 14:
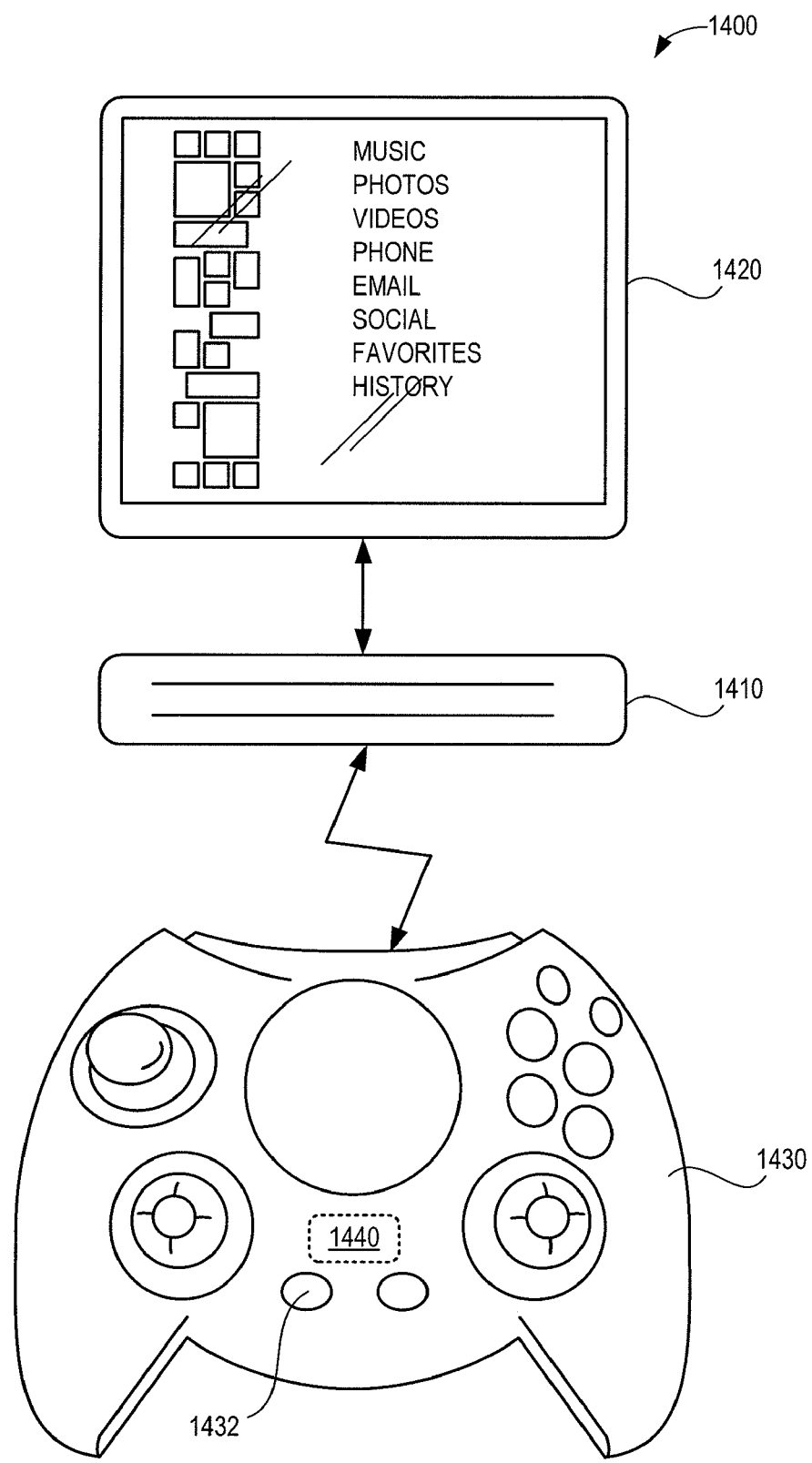
FIG. 14 shows a media system including a game controller in accordance with an embodiment of the present disclosure.

FIG. 14 illustrates yet another example embodiment of a media system 1400. Media system 1400 is analogous to the previously described media device 110. As such, the various methods, operations, process flows, and functionality described herein may be similarly performed by or applied to media system 1400. As with the embodiment of FIG. 13, media system 1400 may include two or more physically separate component devices that may communicate with each other via wired or wireless communication.

For example, media system 1400 may include a graphical display 1420 and a controller 1430 including a button 1432 and motion sensor 1440. Controller 1430 may communicate with graphical display 1420 via a console 1410. As a non-limiting example, memory 160 and logic subsystem 150 may reside at console 1410. As previously described with reference to the process flows of FIGS. 3-5, a user may press a button such as button 1432 to unlock the iconic menu presented via graphical display 1420. The user may then shake or move controller 1430 as detected by motion sensor 1440 to cause icons of the iconic menu to be rearranged (e.g. shuffled). As such, the example embodiment of FIG. 14 illustrates how the media system may perform the various functions and processes described herein through cooperation of multiple physically separate device components.

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A media system, comprising:
 a graphical display;
 a user input device;
 a motion sensor for detecting motion of the graphical display;
 a logic subsystem; and
 memory holding instructions executable by the logic subsystem to cause the logic subsystem to:
  concurrently present an iconic menu and a textual menu via the graphical display,
  the textual menu comprising a structured textual list providing access to a media library including a plurality of media content items, and the iconic menu comprising a plurality of icons arranged in a two-dimensional collection, each icon of the plurality of icons providing access to one of the plurality of media content items;
  unlock the iconic menu responsive to a first user input received at the user input device and lock the iconic menu responsive to a second user input received at the user input device;
  shuffle the plurality of icons relative to each other without shuffling the structured textual list responsive to motion detected by the motion sensor if the iconic menu is unlocked; and
  maintain the plurality of icons in a fixed relative arrangement if motion is detected by the motion sensor while the iconic menu is locked.

2. The media system of claim 1, where the user input device includes a touch-sensitive region of the graphical display.

3. The media system of claim 1, where the user input device includes a button.

4. The media system of claim 1, where the plurality of icons are shuffled relative to each other from a default arrangement to a shuffled arrangement; and where the memory further includes instructions executable by the logic subsystem to cause the logic subsystem to:
 return the plurality of icons to the default arrangement from the shuffled arrangement responsive to a third user input that is directed to the textual menu.

5. The media system of claim 4, where the memory further includes instructions executable by the logic subsystem to cause the logic subsystem to:
 increase a prominence of the textual menu by increasing a size of the textual menu relative to a size of the iconic menu responsive to receiving the third user input that is directed to the textual menu.

6. The media system of claim 1, where the memory further includes instructions executable by the logic subsystem to cause the logic subsystem to:
 shuffle the plurality of icons relative to each other by changing a relative arrangement of one or more icons of the plurality of icons from a first arrangement to a second arrangement in at least two dimensions of the graphical display and maintain a fixed angular orientation of each icon of the plurality of icons relative to the graphical display in both the first arrangement and the second arrangement.

7. The media system of claim 1, where the memory further includes instructions executable by the logic subsystem to cause the logic subsystem to:
 remove one or more icons from the iconic menu when the iconic menu is shuffled; and
 introduce one or more new icons into the iconic menu when the iconic menu is shuffled, the one or more new icons providing access to different media content items of the media library that was not previously accessible via the iconic menu before the plurality of icons were shuffled.

8. The media system of claim 7, where the different media content items include recommended media content; and where the memory further includes instructions executable by the logic subsystem to cause the logic subsystem to:
 identify the recommended media content from the media library responsive to an operating condition of the media system.

9. The media system of claim 8, where the operating condition of the media system includes media content that was previously accessed via the plurality of icons.

10. The media system of claim 1, where the two-dimensional collection of icons defines one or more columns of icons and two or more rows of icons.

11. The media system of claim 10, where a size of the one or more columns and a size of the two or more rows are based on a size of each icon of the plurality of icons.

12. The media system of claim 1, where the plurality of icons provide access to the media content items forming a subset of media content of the media library.

13. The media system of claim 1, where each media content item includes one or more of visual content, audio content, communication content, favorite content, recommended content, newly available content, recently added content, news about content, and social content.

14. The media system of claim 1, where the motion sensor includes one or more of an optical element and an accelerometer.

15. A method of operating a media system having a media library including media content, the method comprising:
  presenting an iconic menu via a graphical display of the media system, the iconic menu comprising a two-dimensional collection of icons which collectively provide access to a subset of media content of the media library;
  presenting a textual menu via the graphical display, the textual menu comprising a structured list of the media content of the media library;
  receiving a user input directed to the iconic menu;
  responsive to receiving the user input directed to the iconic menu, reducing a size of the textual menu to a diminished scale;
  receiving an indication of motion of the media system via a motion sensor of the media system;
  responsive to receiving the indication of motion of the media system while the size of the textual menu is reduced to the diminished scale, maintaining the structured list of the textual menu in a fixed arrangement while rearranging one or more of the icons within the two-dimensional collection from a first arrangement to a second arrangement;
  receiving a user input directed to the textual menu; and
  responsive to receiving the user input directed to the textual menu, reducing a size of the iconic menu to a diminished scale and rearranging the icons to the first arrangement.

16. The method of claim 15, where the media system includes a button; and where one or both of the user input directed to the iconic menu and the user input directed to the textual menu is received via the button.

17. The method of claim 15, where the media system includes one or more touch-sensitive regions of the graphical display, and where one or both of the user input directed to the iconic menu and the user input directed to the textual menu is received via the one or more touch-sensitive regions of the graphical display.

18. A media system, comprising:
  a graphical display;
  a user input device;
  a motion sensor for detecting motion of the graphical display;
  a logic subsystem; and
  memory holding instructions executable by the logic subsystem to cause the logic subsystem to:
    present an iconic menu via the graphical display, the iconic menu comprising a plurality of icons having disparate relative sizes arranged in a two-dimensional collection, each icon of the plurality of icons providing access to a first subset of media content of a media library;
    present a textual menu via the graphical display, the textual menu comprising a structured textual list providing access to the media library;
    unlock the iconic menu responsive to a first user input received at the user input device;
    lock the iconic menu responsive to a second user input received at the user input device;
    increase a size of the iconic menu relative to a size of the textual menu responsive to a third user input received at the user input device if the third user input is directed to the iconic menu, and increase the size of the textual menu relative to the size of the iconic menu if the third input received at the user input device is directed to the textual menu;
    shuffle the plurality of icons relative to each other in at least two dimensions of the graphical display responsive to a shaking motion detected by the motion sensor without shuffling the textual menu if the iconic menu is unlocked;
    replace one or more icons of the iconic menu with one or more new icons responsive to shuffling of the plurality of icons, the new icons providing access to a second subset of media content of the media library; and
    maintain the plurality of icons of the iconic menu in a fixed relative arrangement if the shaking motion is detected by the motion sensor when the iconic menu is locked.

* * * * *